(12) United States Patent
Beyabani (10) Patent No.: US 8,453,192 B2
(45) Date of Patent: May 28, 2013

(54) TV SLIDESHOW

(75) Inventor: Syed Zafar Beyabani, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 699 days.

(21) Appl. No.: 12/125,710

(22) Filed: May 22, 2008

(65) Prior Publication Data

US 2009/0293097 A1   Nov. 26, 2009

(51) Int. Cl.
*H04N 7/173* (2011.01)
*H04N 7/10* (2006.01)
*H04N 7/25* (2006.01)

(52) U.S. Cl.
USPC ............................................ 725/131; 725/47

(58) Field of Classification Search
USPC ............................................... 725/47; 386/52
See application file for complete search history.

(56) References Cited

U.S. PATENT DOCUMENTS

2005/0149970 A1* 7/2005 Fairhurst et al. ................ 725/47
2007/0154164 A1* 7/2007 Liu et al. ......................... 386/52

FOREIGN PATENT DOCUMENTS

JP    2006041588 A  *  2/2006

* cited by examiner

*Primary Examiner* — Scott Beliveau
*Assistant Examiner* — Christine Kurien (57) ABSTRACT

A system may include a set-top box to detect a trigger and capture a first snapshot from a first television channel in response to detecting the trigger and based on a set of slideshow configuration parameters. The system may further provide the first snapshot to a display as a part of a television slideshow.

23 Claims, 11 Drawing Sheets

| TIME PD 510 | CATEGORY 520 | CHANNELS 530 | ORDER 540 | NO 550 | SPECIAL EFFECT 560 | TIME BETWEEN TRANSITIONS 570 |
|---|---|---|---|---|---|---|
| WEEKENDS | ALL | ALL | RANDOM | 5 | FLYING WINDOW | 5 SECONDS |
| WEEKDAYS, BETWEEN 7 PM AND 12 AM | | 713, 714, 202, 121, 4, 212, ... | ASCENDING | 3 | CUBE FACES | 20 SECONDS |
| WEEKDAYS, BETWEEN 7 AM AND 5 PM | KIDS, SPORTS | ALL | DESCENDING | 1 | SEQUENTIAL-FADING | RANDOM |
| ... | | | | | | |
| TIME PD | CATEGORY | CHANNEL(S) | ORDER | NO | EFFECT | TIME |

TV SLIDESHOW

BACKGROUND INFORMATION

Television distribution systems, such as fiber optic networks, cable networks, and satellite networks, provide users with a large number of television programs. In some instances, a set-top box may receive television programming from a television distribution system and provide the television programming to a display, such as a television.

DETAILED DESCRIPTION OF PREFERRED EMBODIMENTS

The following detailed description of exemplary embodiments refers to the accompanying drawings. The same reference numbers in different drawings may identify the same or similar elements. Also, the following detailed description does not limit the invention.

Figure 1:
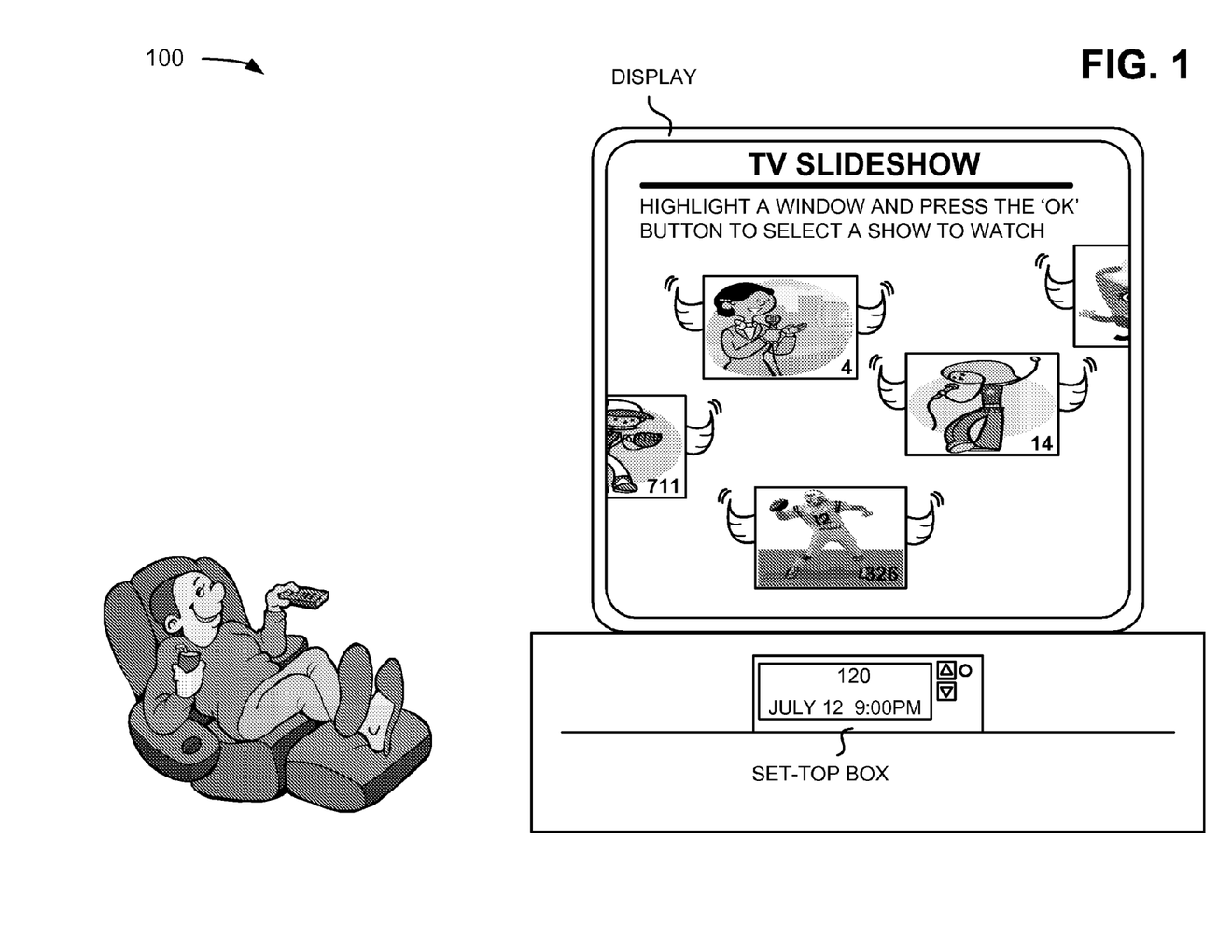
FIG. 1 is an exemplary diagram illustrating a concept described herein.

FIG. 1 is an exemplary diagram illustrating a concept 100 described herein. As illustrated, a set-top box may be associated with a display, which provides a television slideshow to a user. For example, as illustrated in FIG. 1, the set-top box may cause floating snapshots of television programming to be captured. If the user sees a snapshot of a television program in which the user may be interested, the user may use a remote control to select the snapshot. As a result, the set-top box may become tuned to the channel corresponding to the snapshot.

Figure 2:
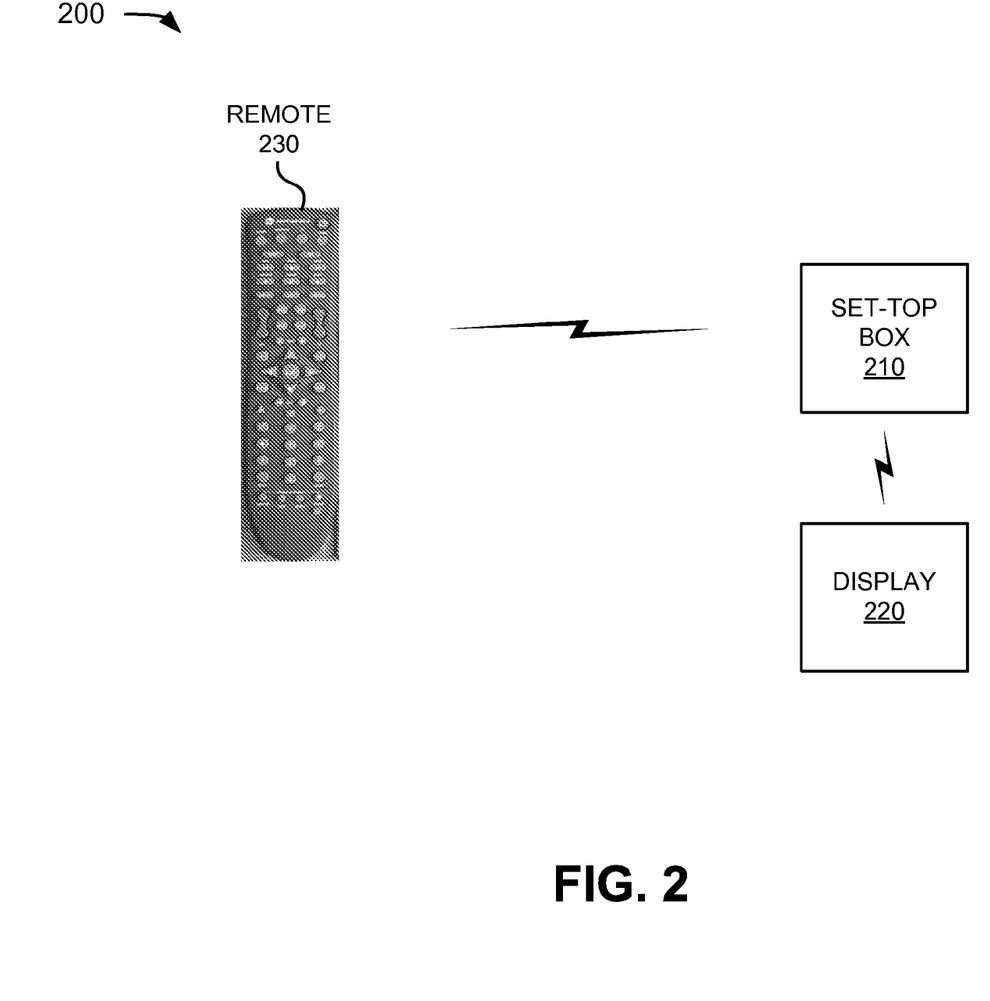
FIG. 2 is an exemplary arrangement in which systems and methods, consistent with exemplary embodiments, may be implemented.

FIG. 2 is an exemplary arrangement 200 in which systems and methods, consistent with exemplary embodiments, may be implemented. As illustrated, arrangement 200 may include a set-top box 210, a display 220, and a remote control 230. The number of set-top boxes 210, displays 220, and remote controls 230 illustrated in FIG. 2 is provided for simplicity. In practice, there may be more set-top boxes 210, displays 220, and remote controls 230. Moreover, it will be appreciated that one or more components in FIG. 2 may perform one or more of the tasks described as being performed by one or more other components illustrated in FIG. 2.

Set-top box 210 may include a device that receives television programming (which includes any type of content that can be provided to display 220) and provides the television programming to display 220. Set-top box 210 may further capture snapshots (e.g., images) of television programming and provide the snapshots to display 220 in response to a trigger. In one embodiment, set-top box 210 may include a digital video recorder or another type of recorder that may record television programming. In another embodiment set-top box 210 may be associated with an external digital video recorder or another type of recorder, such as a video cassette recorder, an external storage device, or a remote viewing device, such as a Slingbox™ from Sling Media.

Display 220 may include any display that is capable of displaying television programming. For example, display 220 may include a direct view tube television, a plasma television, a liquid crystal display (LCD) television, or a rear or front projection television.

Remote control 230 may include a device capable of remotely controlling the operation of set-top box 210 and/or display 220, for example, via the transmission of signals, such as infrared signals. Remote control 230 may include a group of buttons. In one embodiment, remote control 230 may include a button that initiates the capturing of television programming snapshots and/or the providing of television programming snapshots to display 220.

Figure 3:
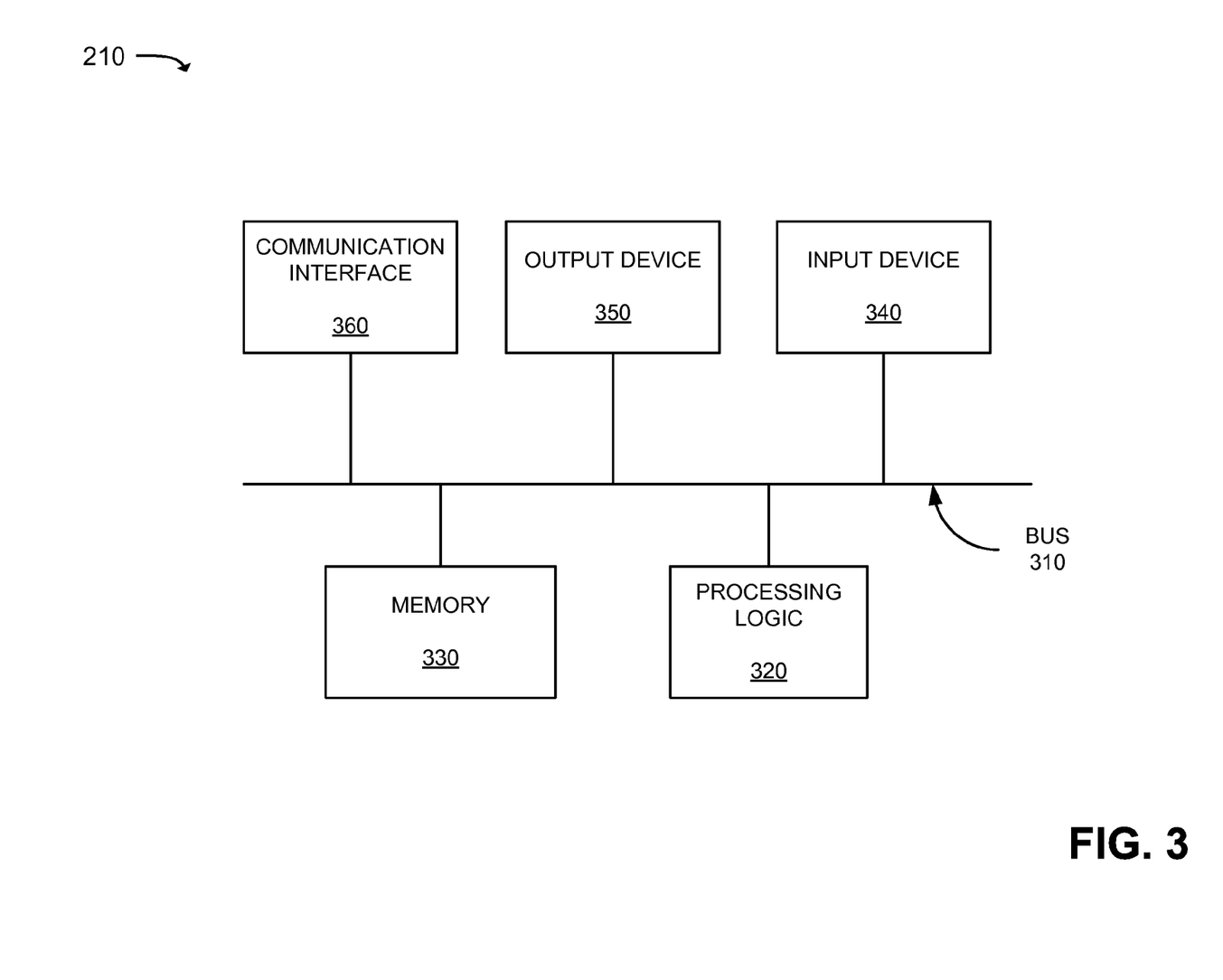
FIG. 3 is an exemplary block diagram of the set-top box of FIG. 2.

FIG. 3 is an exemplary block diagram of set-top box 210. As illustrated, set-top box 210 may include a bus 310, processing logic 320, a memory 330, an input device 340, an output device 350, and a communication interface 360. It will be appreciated that set-top box 210 may include additional (or other) components than illustrated in FIG. 3.

Bus 310 may include a path that permits communication among the elements of set-top box 210. Processing logic 320 may include a processor, microprocessor, or other type of processing logic, such as an application specific integrated circuit (ASIC), field programmable gate array (FPGA), etc., that may interpret and execute instructions. Memory 330 may include a random access memory (RAM) or another type of dynamic storage device that may store information and instructions for execution by processing logic 320, read only memory (ROM) or another type of static storage device that may store static information and instructions for use by processing logic 320, and/or another type of storage device.

Input device 340 may include a mechanism that permits an operator to input information to set-top box 210, such as buttons or a touch-screen interface. Output device 350 may include a mechanism that outputs information to the operator, such as a display. Communication interface 360 may include any transceiver-like mechanism that enables set-top box 210 to receive and/or send information from/to other devices and/or systems, such as display 220, remote control 230, one or more entertainment components (e.g., a speaker, a video recorder, etc.), etc.

As will be described in detail below, set-top box 210 may perform certain operations. Set-top box 210 may perform these and other operations in response to processing logic 320 executing software instructions contained in a computer-readable medium, such as memory 330. A computer-readable medium may be defined as a physical or logical memory device.

The software instructions may be read into memory 330 from another computer-readable medium or from another device via communication interface 360. The software instructions contained in memory 330 may cause processing logic 320 to perform processes that will be described later. Alternatively, hardwired circuitry may be used in place of, or in combination with, software instructions to implement processes consistent with exemplary embodiments. Thus, embodiments described herein are not limited to any specific combination of hardware circuitry and software.

Figure 4:
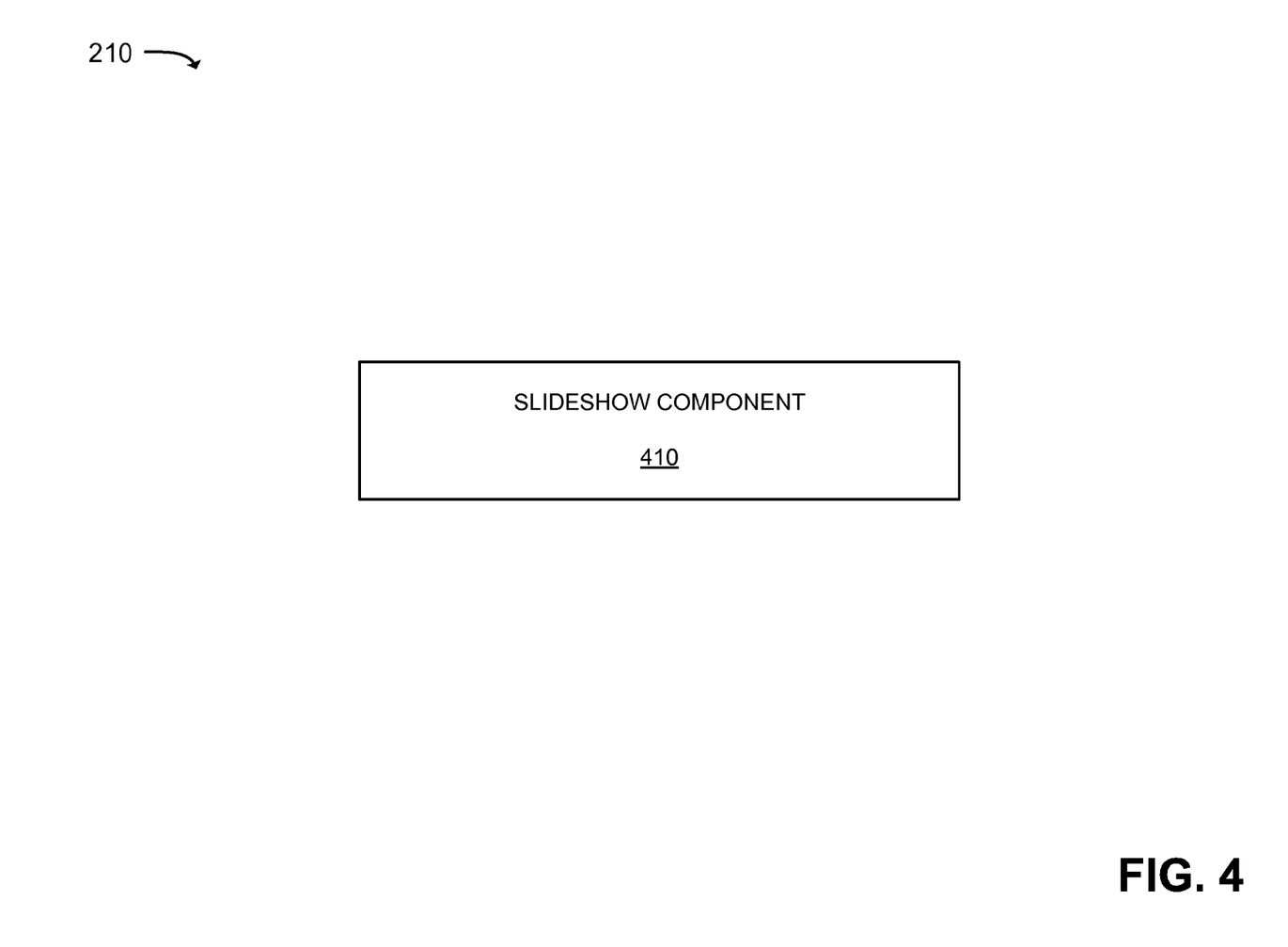
FIG. 4 is an exemplary functional diagram of a portion of the set-top box of FIG. 2.

FIG. 4 is an exemplary functional diagram of a portion of set-top box 210 according to an exemplary embodiment. As illustrated, set-top box 210 may include a slideshow component 410. It will be appreciated that set-top box 210 may include other components that aid in providing television programming to display 220.

Slideshow component 410 may include one or more components that capture snapshots of television programming, in response to detecting a trigger, and provide the snapshots according to a set of slideshow configuration parameters. To capture the snapshots, slideshow component 410 may tune to a first channel and capture an image of the programming that is currently being provided on the first channel. Slideshow component 410 may then tune to a second channel and capture a snapshot of the programming that is currently being provided on the second channel. Slideshow component 410 may continue tuning to channels and capturing snapshots for other channels included in the slideshow. In those situations where set-top box 210 includes more than one tuner, the speed at which snapshots are captured may be increased. For example, slideshow component 410 may tune to multiple channels and capture snapshots from those channels simultaneously. Slideshow component 410 may provide the snapshots to display 220 as they are captured (e.g., one at a time) or may store one or more snapshots and provide the one or more snapshots to display 220 according to the set of slideshow configuration parameters. Slideshow component 410 may continue tuning to channels, capturing snapshots, and providing snapshots until the user ends the process by, for example, turning off set-top box 210, tuning set-top box 210 to a channel (e.g., by selecting the channel up/down buttons on remote control 230 or set-top box 210 or entering a particular channel number into remote control 230), etc.

Figure 5:
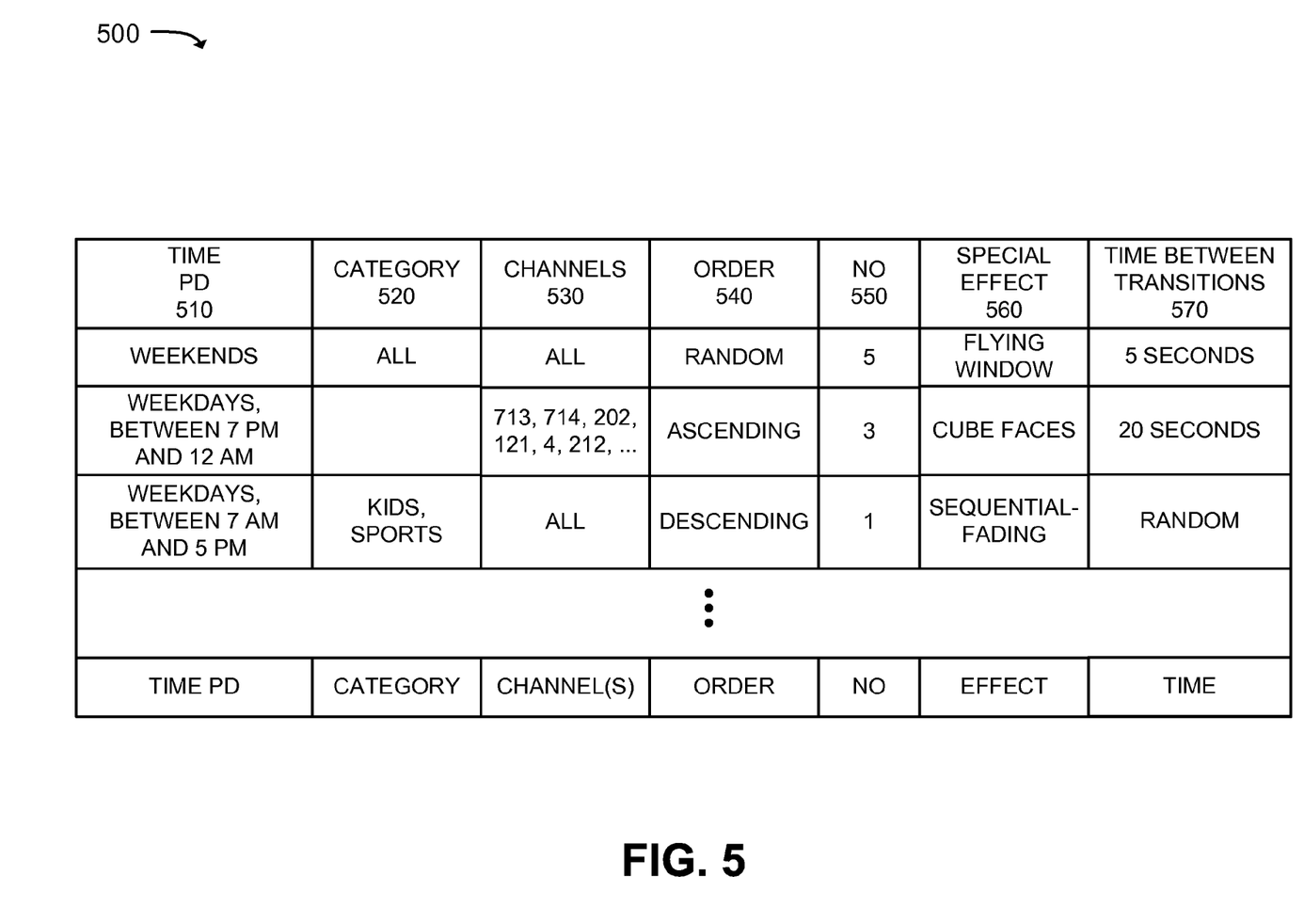
FIG. 5 is a portion of a computer-readable medium that may be associated with the set-top box of FIG. 2.

FIG. 5 is an exemplary diagram of a portion of a computer-readable medium 500 that may be associated with set-top box 210. Additionally or alternatively, computer-readable medium 500 may be associated with another device, such as a server. While one computer-readable medium is described below, it will be appreciated that computer-readable medium 500 may include multiple computer-readable media stored locally at set-top box 120, or stored at one or more different and possibly remote locations.

As illustrated, computer-readable medium 500 may maintain a group of entries in the following exemplary fields: a time period (PD) field 510, a category field 520, a channels field 530, an order field 540, a number (NO) field 550, a special effect field 560, and a time between transitions field 570. Computer-readable medium 500 may maintain additional or different slideshow configuration parameters than illustrated in FIG. 5 that aid in providing a television slideshow.

Time period field 510 may store a time period for which an identified television programming slideshow is to be provided. The time period may include, for example, a date, a date range, one or more days of a week, a time period, and/or some other quantity of time. In one embodiment, the time period may be user-specified. In some embodiments, no time period may be provided in time period field 510, which may cause the same identified television programming slideshow to be provided in response to all triggers.

Category field 520 may store one or more television programming categories. For example, the television programming categories may include known categories, such as movie, children's, educational, news, sports, etc. In one embodiment, the category or categories identified in category field 520 may be user-specified.

Channels field 530 may store information identifying channels, for which snapshots are to be captured, of a group of channels available to a user through set-top box 210. In those instances when one or more categories are identified in category field 520, channels field 530 may store information identifying all or a portion of the channels that correspond to the identified one or more categories. In those situations where no category is identified in category field 520, channels field 530 may store a list of channels from the group of channels available to a user through set-top box 210. In one embodiment, the list of channels may be user-specified.

Order field 540 may store information indicating an order in which the channels identified in channels field 530 are to be provided in the slideshow. For example, the order may include a random order, an ascending order, or a descending order. In one embodiment, the order in which the channels are provided may be user-specified. In some embodiments, a default order (e.g., a random order) may be provided when no order is specified by the user.

Number field 550 may store information indicating the number of snapshots to be simultaneously provided on display 220. For example, a set of slideshow configuration parameters may specify that 5 snapshots are to be simultaneously provided. In one embodiment, the number of simultaneous snapshots may be user-specified. In some embodiments, a default number of simultaneous snapshots may be provided when no number of simultaneous snapshots is specified by the user.

Special effect field 560 may store information indicating how the captured snapshots are to be provided. For example, the special effect may include providing the captured snapshots sequentially (with or without some type of transition effect, such as fading), on rotating cube faces, as windows flying across or around on display 220, stacked on top of one another, tiled, and/or in any other known manner. In some embodiments, slideshow component 410 may automatically select a special effect or may limit the number of special effects that may be selected based on the number of simultaneous snapshots to be provided. In some embodiments, more than one special effect may be used for providing the snapshots (e.g., cube faces and flying windows). In one embodiment, the special effect(s) may be user-specified. In some embodiments, a default special effect may be provided when no special effect is specified by the user.

Time between transition field 570 may store information indicating an amount of time that one or more displayed snapshots are to be displayed. The amount of time may be specified in seconds or in another unit of time. In one embodiment, the amount of time may be user-specified. In some embodiments, a default amount of time may be provided when no amount of time is specified by the user.

As one example of a set of slideshow configuration parameters for a television slideshow, as illustrated in FIG. 5, a user specified that during the weekends, snapshots are to be captured from all of the channels provided by set-top box 210, the snapshots are to be provided in a random order, five snapshots are to be simultaneously provided, and the snapshots are to be provided as flying windows, with snapshots of different channels being provided every 5 seconds. As further example, the user has also specified that during weekdays, between the hours of 7 PM and 12 AM, snapshots are to be captured from channels 713, 714, 202, 121, 4, 212, etc., the snapshots are to be captured in an ascending order, 3 snapshots are to be simultaneously provided, and the snapshots are to be provided on rotating cube faces, with snapshots of different channels being provided every 20 seconds. As one additional example, the user has specified that during weekdays, between the hours of 7 AM and 5 PM, snapshots are to be captured from all the channels associated with the kids and sports categories, the snapshots are to be captured in a descending order, a single snapshot is to be provided at a time, snapshots are to be provided sequentially with each snapshot fading out, and a snapshot of a different channel is to be provided at a random time interval.

Figure 6:
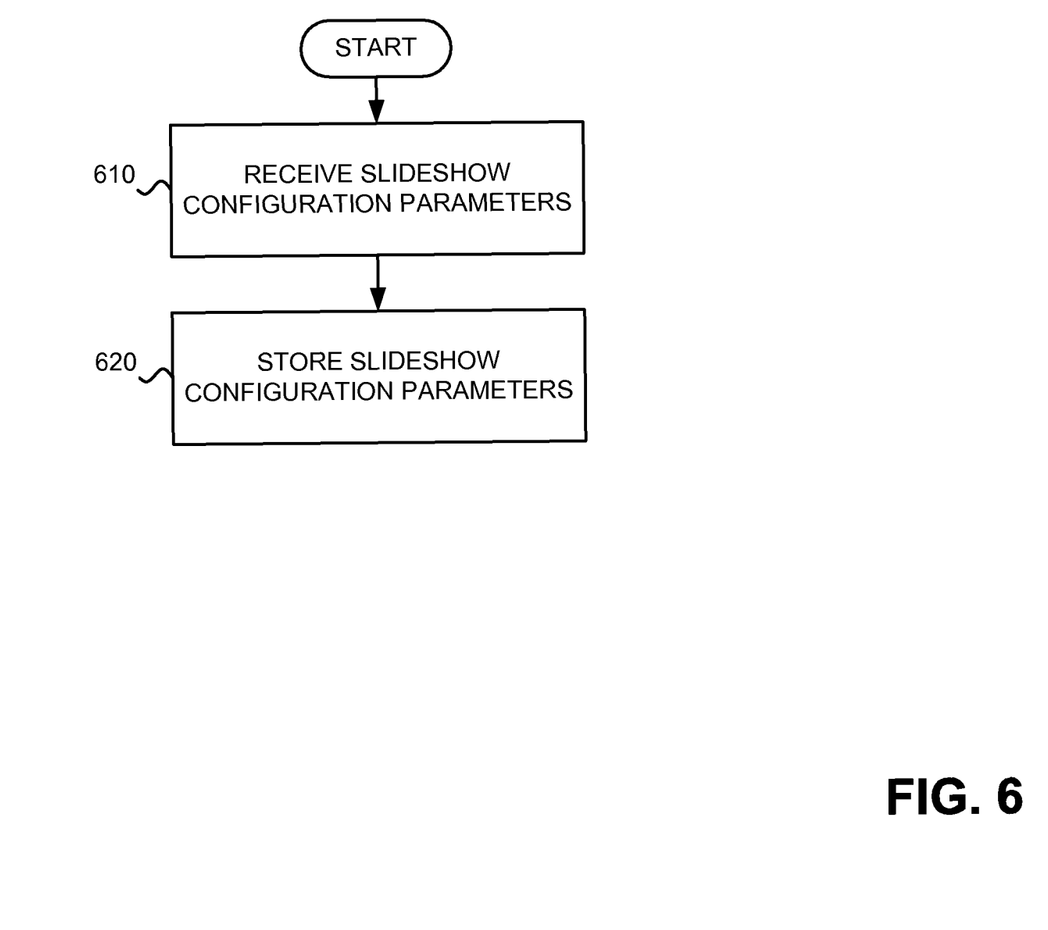
FIG. 6 is a flow chart of exemplary processing for configuring slideshow parameters.

FIG. 6 is a flow chart of exemplary processing for setting slideshow configuration parameters. In one embodiment, the processing of FIG. 6 may be performed by set-top box 210. In another embodiment, some or all of the processing described below may be performed by one or more devices, such as a server.

Processing may begin with set-top box 210 (e.g., slideshow component 410) receiving slideshow configuration parameters from a user (block 610). A user may transmit a request to initiate the configuration of the television slideshow. For example, the user may press a button on remote control 230 or a button on set-top box 210. In response, set-top box 210 may cause a graphical user interface to be displayed on display 220. The graphical user interface may allow the user to enter slideshow configuration parameters by, for example, entering the appropriate information using, for example, remote control 230.

Once the desired slideshow configuration parameters have been entered, set-top box 210 (e.g., slideshow component 410) may store the slideshow configuration parameters (block 620). For example, slideshow component 410 may store the slideshow configuration parameters in a computer-readable medium, such as computer-readable medium 500.

In one embodiment, set-top box 210 (e.g., slideshow component 410) may determine whether a new time period specified in the newly received set of slideshow configuration parameters conflicts (e.g., matches or overlaps) with an already stored time period associated with a different set of slideshow configuration parameters. If the new time period conflicts with an already stored time period, set-top box 210 (e.g., slideshow component 410) may request that the user provide a priority to the two sets of slideshow configuration parameters.

Figure 7:
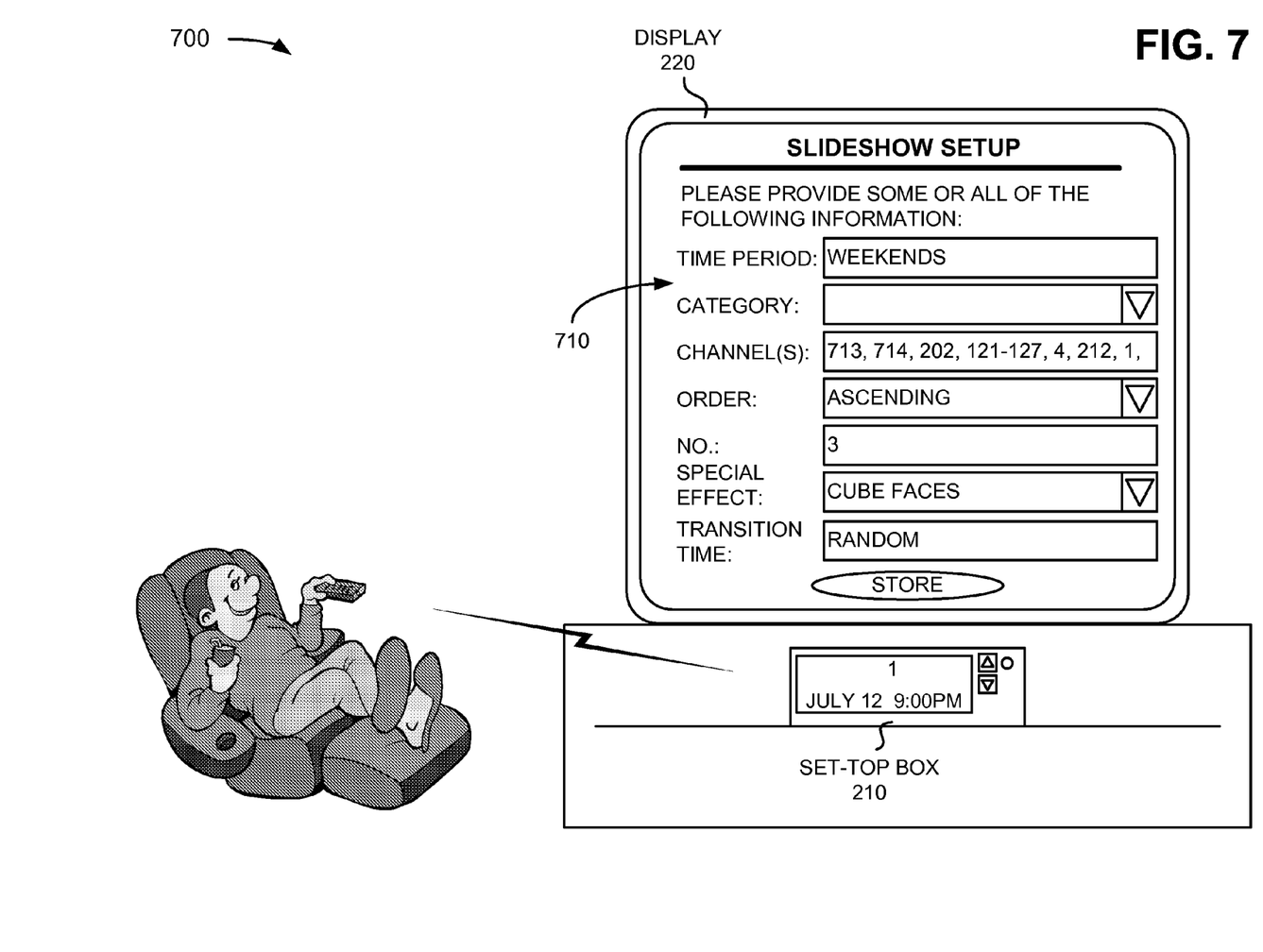
FIG. 7 is an example of the processing described above with respect to claim 6.

FIG. 7 is an example 700 of the processing described above with respect to FIG. 6. In example 700, assume that a user has requested to configure a set of slideshow configuration parameters. In response to the request, set-top box 210 may provide a graphical user interface 710 that allows the user to enter a set of slideshow configuration parameters. As illustrated in FIG. 7, graphical user interface 710 may allow the user to specify any or all of the following exemplary parameters: one or more time periods, one or more categories, one or more channels, an order in which snapshots are to be provided, a number of snapshot to be simultaneously provided, one or more special effects, and a transition time. In example 700, the user has specified that during weekends, snapshots are to be captured for channels 713, 714, 202, 121-127, 4, 212, 1, etc. The user has further specified that the snapshots are to be captured from the identified channels in an ascending order (e.g., from channel 1 first, channel 4 second, etc.). Moreover, the user specified that three snapshots are to be provided simultaneously on rotating cube faces and that new snapshots are to be provided after a random time period. By selecting the "STORE" button on graphical user interface 710, set-top box 210 may store the received set of slideshow configuration parameters in, for example, computer-readable medium 500.

Figure 8:
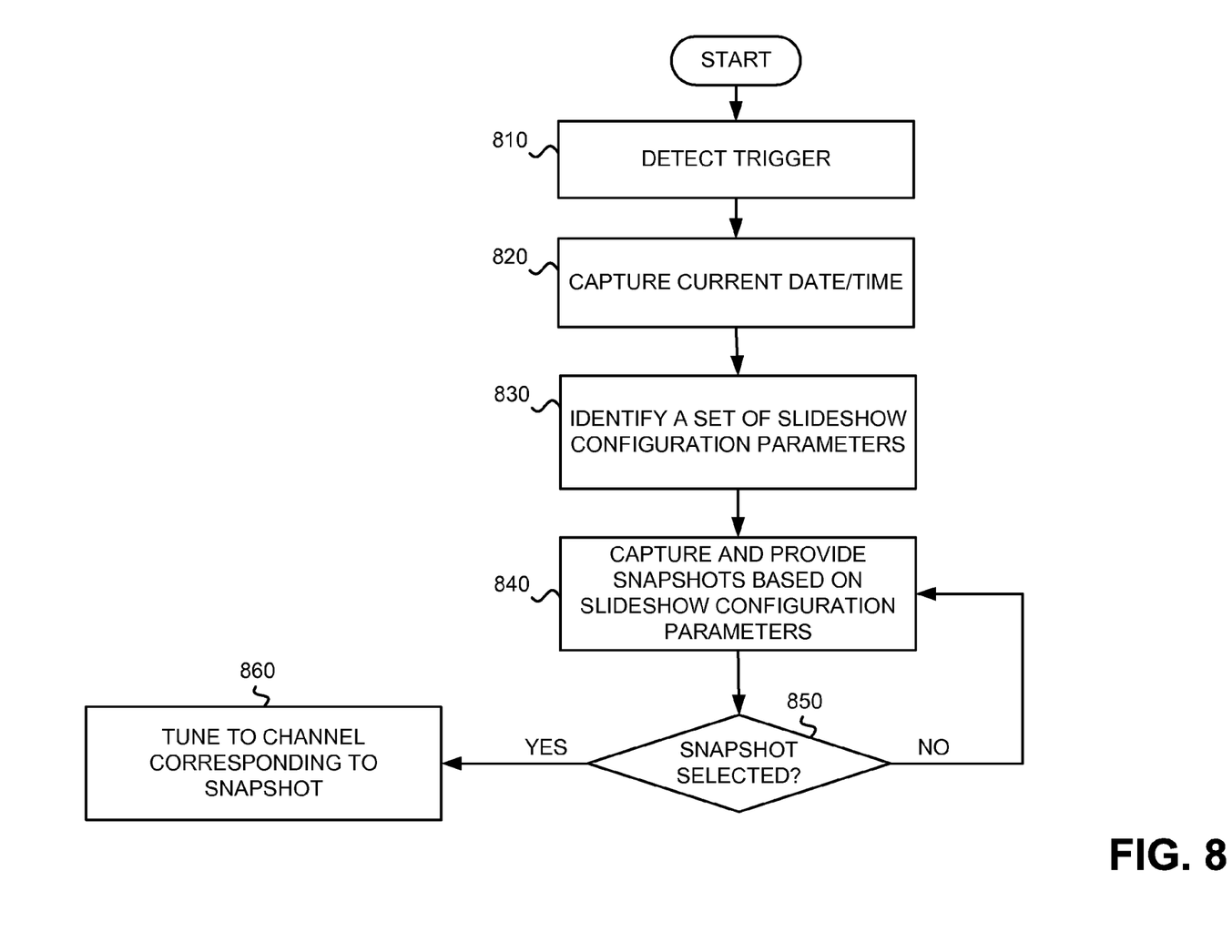
FIG. 8 is a flow chart of exemplary processing for providing a television slideshow.

FIG. 8 is a flow chart of exemplary processing for providing a television slideshow according to an exemplary embodiment. In one embodiment, the processing of FIG. 8 may be performed by set-top box 210. In another embodiment, some or all of the processing described below may be performed by one or more devices, such as display 220 and/or a server.

Processing may begin with set-top box 210 detecting a trigger (block 810). The trigger may be based on a number of factors, such as, for example, a period of inactivity, the channel to which set-top box 210 is tuned, an item selected from a menu provided by set-top box 210, or a shortcut button selected from remote control 230. For example, the trigger may include a signal indicating that a time period has elapsed since the user has interacted with set-top box 210. In one embodiment, set-top box 210 (e.g., slideshow component 410) may start a timer each time the user interacts with set-top box (e.g., each time a signal is received from remote control 230 or the user presses a button on set-top box 210, such as a volume or channel button). If the timer reaches a threshold value, a signal may be generated indicating that the threshold value has been met. The threshold value may be configured by the user and/or automatically adjusted based on a number of factors, such as the current channel to which the user is tuned. For example, if the user is tuned to a movie channel, where less user interaction is expected, the threshold value may be set to a larger value (corresponding to a longer time period) than if the user is tuned to a 30 minute program.

The trigger may alternatively be detected based on the user tuning set-top box 210 to a particular channel. For example, a channel may be dedicated to providing a television slideshow. Thus, if the user tunes set-top box 210 to that channel, set-top box 210 (e.g., slideshow component 410) may detect the tuning and initiate the television slideshow.

As yet another alternative, the trigger may be detected based on the user selecting an item from a menu provided by set-top box 210. For example, set-top box 210 may provide a menu that allows the user to configure a number of settings associated with providing television programming. The menu may include a menu item that allows the user to initiate the television slideshow. Thus, set-top box 210 (e.g., slideshow component) may detect selection of the television slideshow menu item.

The trigger may further be detected in response to receiving a signal from remote control 230. For example, remote control 230 may include a television slideshow shortcut button that, when selected, sends a particular signal to set-top box 210. The signal (e.g., an infrared or radio frequency signal) allows the user to initiate the television slideshow.

Set-top box 210 may capture a current date/time (block 820). For example, set-top box 210 may store a calendar application and a clock. Set-top box 210 (e.g., slideshow component 410) may capture a current date and a current time in response, for example, to detecting the trigger.

Set-top box 210 may identify a set of slideshow configuration parameters (block 830). In one embodiment, set-top box 210 (e.g., slideshow component 410) may use the captured date/time to look up a set of slideshow configuration parameters from, for example, computer-readable medium 500. As an example, if the captured date/time indicates that it is currently a weekend day, set-top box 210 may identify the first entry illustrated in computer-readable medium 500 of FIG. 5 (i.e., the entry for weekends) as the appropriate set of slideshow configuration parameters.

Set-top box 210 may capture and provide snapshots based on the identified set of slideshow configuration parameters (block 840). For example, set-top box 210 (e.g., slideshow component 410) may begin capturing snapshots of channels identified in the set of slideshow configuration parameters in an order indicated by the set of slideshow configuration parameters. As one example, for the weekends entry in computer-readable medium 500, set-top box 210 may sequentially capture snapshots from five random channels of all of the channels provided by set-top box 210. Set-top box 210 may simultaneously provide the five snapshots in flying windows on display 220. Set-top box 210 may continue capturing snapshots and may replace the snapshots provided to display 220 every five seconds, as indicated by the set of slideshow configuration parameters.

Set-top box 210 may determine whether the user has selected a snapshot that is currently being provided on display 220 (block 850). For example, if the user sees a program that is of interest, the user may, via remote control 230, highlight the desired snapshot (corresponding to the program) on display 220, and press a particular button on remote control 230, such as an "enter" or "OK" button, to select the snapshot. Other ways for selecting a snapshot may alternatively be used.

If set-top box 210 determines that no snapshot has been selected (block 850—NO), processing may return to block 840 with set-top box 210 continuing to capture and provide snapshots based on the identified set of slideshow configuration parameters. If, on the other hand, set-top box 210 determines that a snapshot has been selected (block 850—YES), set-top box 210 may tune to the channel corresponding to the selected snapshot (block 860), which causes set-top box 210 to provide the program corresponding to the selected snapshot to display 220. Other ways of terminating the television slideshow are also possible. For example, the television slideshow may be terminated by turning off set-top box 210, tuning set-top box 210 to a channel (e.g., by selecting the channel up/down buttons on remote control 230 or set-top box 210 or entering a particular channel number into remote control 230), etc.

Figure 9A:
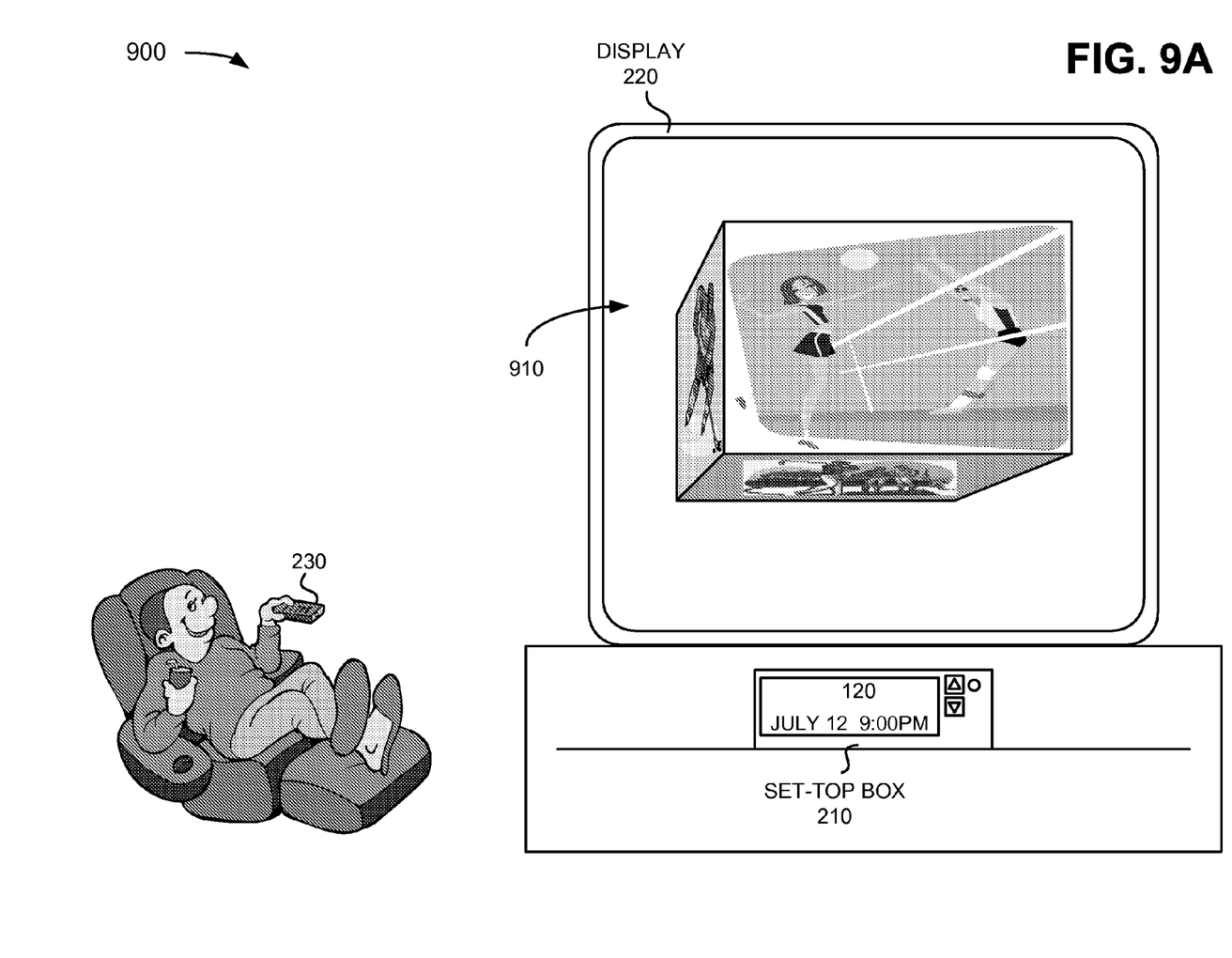
FIGS. 9A-9C are an example of the processing described in FIG. 8.
Figure 9B:
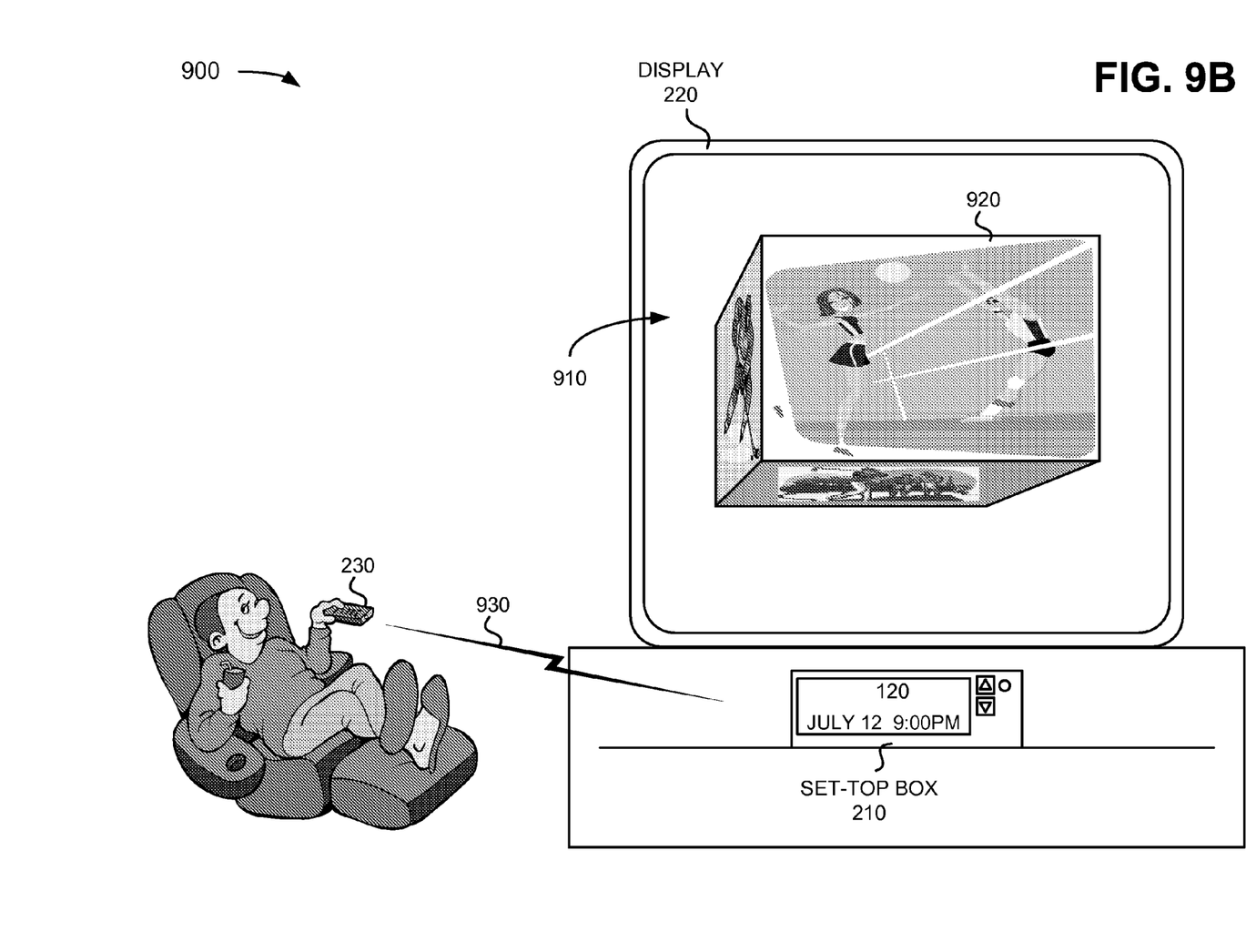
Figure 9C:
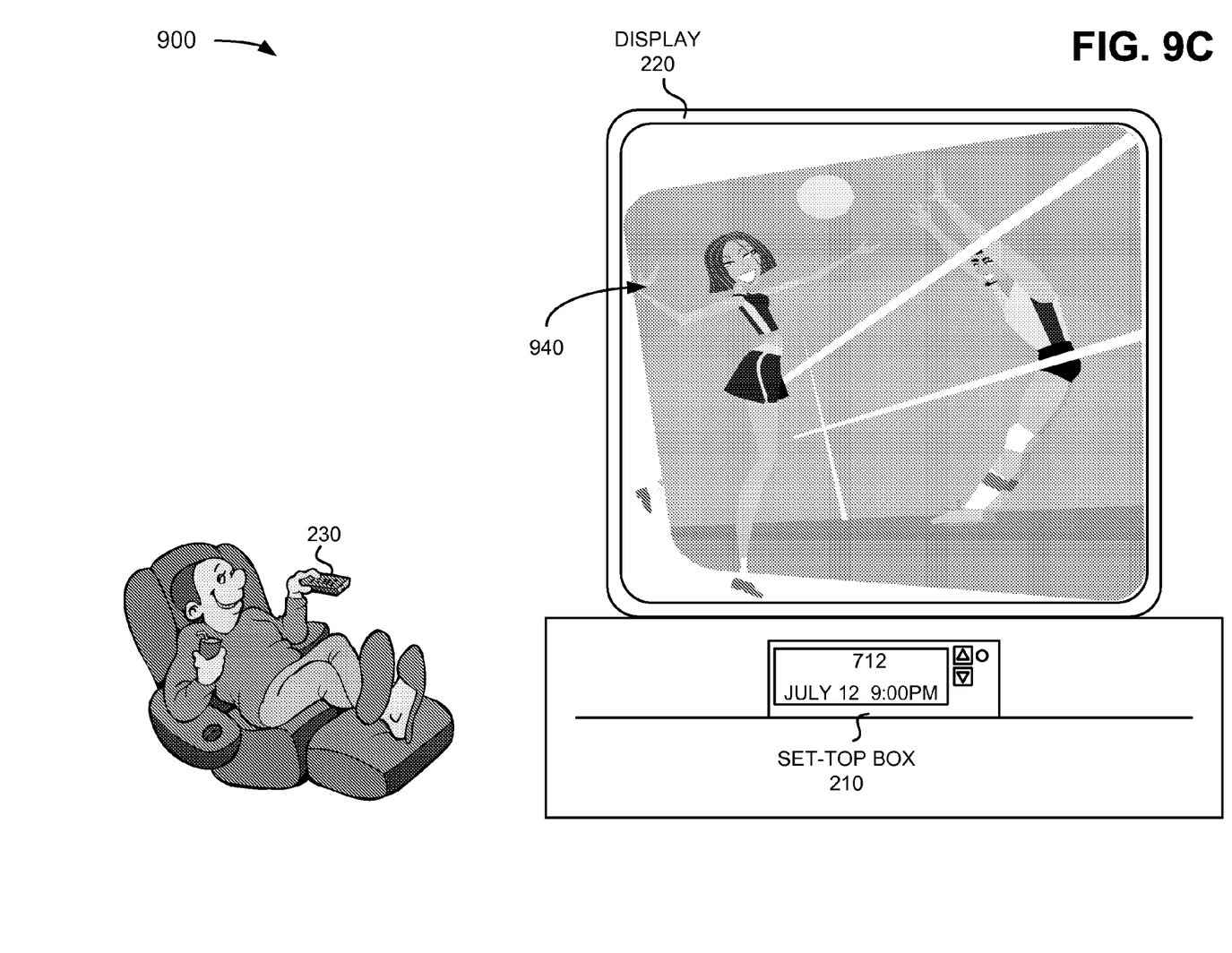

The following example 900 of FIGS. 9A-9C illustrates the processing described above with respect to FIG. 8. In example 900, assume that a user has stored the sets of slideshow configuration parameters illustrated in computer-readable medium 500 of FIG. 5. Moreover, assume that the period of inactivity (i.e., the amount of time since the user has interacted with set-top box 210) exceeds a threshold. In response, set-top box 210 may capture a current date/time. Assume, for example 900, that the current date/time corresponds to a weekday and the time is 9:00 PM. As such, set-top box 210 may retrieve the set of slideshow configuration parameters in the second entry of computer-readable medium 500. Based on the set of slideshow configuration parameters, set-top box 210 may begin capturing snapshots of the channels identified in the set of slideshow configuration parameters (in ascending order) and simultaneously providing three snapshots on faces of a rotating cube 910, as illustrated in FIG. 9A.

Assume, as illustrated in FIG. 9B, that the user highlights snapshot 920 of the forwarding facing side of rotating cube 910 and, via remote control 230, provides a signal 930 to set-top box 210 indicating selection of snapshot 920. In response, set-top box 210 may tune to the channel corresponding to snapshot 920 and provide a program 940 that is currently being provided on the channel, as illustrated in FIG. 9C.

Embodiments described herein provide a slideshow of television programming. In one embodiment, a user may configure settings for the television slideshow, including how television programming snapshots are to be displayed, how long each snapshot is to be displayed, the order in which the snapshots are to be displayed, etc. When the user sees a program of interest, the set-top box may allow the user to select the appropriate snapshot (i.e., the one corresponding to the program of interest), which causes the set-top box to tune to the appropriate channel.

The foregoing description of exemplary embodiments provides illustration and description, but is not intended to be exhaustive or to limit the invention to the precise form disclosed. Modifications and variations are possible in light of the above teachings or may be acquired from practice of the invention. For example, while the above description focused on capturing and providing snapshots of television programming, in other embodiments, the set-top box may obtain images (e.g., by providing a request for images of particular programs to a server) corresponding to the channels for which snapshots are to be captured. The obtained images may then be used for the television slideshow.

While series of blocks have been described with respect to FIGS. 6 and 8, the order of the blocks may be varied in other embodiments. Moreover, non-dependent blocks may be implemented in parallel.

The exemplary embodiments, as described above, may be implemented in many different forms of software, firmware, and hardware in the implementations illustrated in the figures. The actual software code or specialized control hardware used to implement the exemplary embodiments described herein is not limiting of the invention. Thus, the operation and behavior of the exemplary embodiments were described without reference to the specific software code—it being understood that one would be able to design software and control hardware to implement the exemplary embodiments based on the description herein.

Further, certain portions of the invention may be implemented as "logic" that performs one or more functions. This logic may include hardware, such as an application specific integrated circuit, a field programmable gate array, a processor, or a microprocessor, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system comprising:
a memory to store instructions; and
a processor to execute the instructions to:
    receive, from a user, a plurality of sets of slideshow configuration parameters,
        each set of slideshow configuration parameters, of the plurality of sets of slideshow configuration parameters, including:
            information identifying one or more television channels, and
            information identifying a different period of time during which the set of slideshow configuration parameters applies,
    store the plurality of sets of slideshow configuration parameters in the memory,
    detect a trigger,
    capture at least one of a current date or a current time based on detecting the trigger,
    search the memory, using the captured at least one of the current date or the current time, to identify a set of slideshow configuration parameters from the plurality of sets of slideshow configuration parameters,
        the captured at least one of the current date or the current time corresponding to the information identifying the different period of time included in the identified set of slideshow configuration parameters, capture a snapshot from a television channel identified by the information identifying the one or more television channels included in the identified set of slideshow configuration parameters, and provide the snapshot to a display as a part of a television slideshow.

2. The system of claim 1, where the trigger includes at least one of:
a first signal indicating that a period of inactivity has exceeded a threshold value,
a second signal indicating that the system has been tuned to a particular television channel,
a third signal indicating that a slideshow menu item has been selected, or
a fourth signal indicating that the processor has received a fifth signal from a remote control indicating a desire to initiate the television slideshow.

3. The system of claim 1, where the identified set of slideshow configuration parameters further includes:
information identifying a quantity of snapshots to be simultaneously provided to the display, and
where the processor is further to:
capture another snapshot from another television channel identified by the information identifying the one or more television channels included in the identified set of slideshow configuration parameters, and
provide the other snapshot, simultaneously with the snapshot, to the display as a part of the television slideshow, based on the information identifying the quantity of snapshots.

4. The system of claim 1,
where the processor is further to:
capture, based on detecting the trigger, another snapshot from at least one other television channel identified by the information identifying the one or more television channels included in the identified set of slideshow configuration parameters, and
provide the other snapshot to the display as a part of the television slideshow.

5. The system of claim 4, where the identified set of slideshow configuration parameters further includes information identifying an order in which snapshots, from television channels identified by the information identifying the one or more television channels, are to be captured, and
where the processor captures the snapshot from the television channel and the other snapshot in a sequence based on the order.

6. The system of claim 1, where the identified set of slideshow configuration parameters further includes information identifying a special effect with which the snapshot is to be provided, and
where, when providing the snapshot to the display, the processor is to:
provide the snapshot to the display with the special effect.

7. The system of claim 1, where the identified set of slideshow configuration parameters further includes a value representing a quantity of snapshots to be simultaneously provided to the display, and
where, when providing the snapshot to the display, the processor is to:
provide, to the display, the snapshot simultaneously with another snapshot based on the quantity of snapshots.

8. The system of claim 1, where the identified set of slideshow configuration parameters includes a value representing an amount of time during which the snapshot, from the television channel, is to be provided to the display before another snapshot, from another television channel, is provided to the display, and
where the processor is further to:
provide the other snapshot to the display after expiration of the amount of time.

9. The system of claim 1, where the processor is further to:
provide a plurality of snapshots to the display,
detect selection of one snapshot of the plurality of snapshots, and
cause the system to tune to a television channel corresponding to the one snapshot based on detecting the selection of the one snapshot.

10. The system of claim 1,
where the identified set of slideshow configuration parameters further includes information identifying a category of television channels associated with the information identifying one or more television channels, and
where the processor is further to:
capture, based on detecting the trigger, another snapshot from another television channel identified by the information identifying the category of television channels, and
provide the other snapshot to the display as a part of the television slideshow.

11. A method comprising:
receiving, by a device and from a user, a plurality of sets of slideshow configuration parameters,
each set of slideshow configuration parameters, of the plurality of sets of slideshow configuration parameters, including:
information identifying one or more television channels, and
information identifying a different period of time during which the set of slideshow configuration parameters applies;
storing, by the device, the plurality of sets of slideshow configuration parameters in a memory associated with the device;
detecting, by the device, a trigger after storing the plurality of sets of slideshow configuration parameters;
capturing, by the device, at least one of a current date or a current time based on detecting the trigger;
searching, by the device and using the captured at least one of the current date or the current time, the memory to identify a set of slideshow configuration parameters from the stored plurality of sets of slideshow configuration parameters,
the captured at least one of the current date or the current time matching or falling within a range corresponding to the information identifying the different period of time included in the identified set of slideshow configuration parameters;
obtaining, by the device, an image of a program provided on a television channel identified by the information identifying the one or more television channels included in the identified set of slideshow configuration parameters; and
providing, by the device and to a display, the image as a portion of a slideshow.

12. The method of claim 11, where the trigger includes at least one of:
information indicating that a period of inactivity of the device has exceeded a threshold value,
a first user input to tune the device to a particular channel,
a second user input to select a slideshow menu item, or
a third user input to initiate one or more slideshows, and where at least one of the first input, the second input, or the third input is received from a remote control.

13. The method of claim 11, where the identified set of slideshow configuration parameters further includes information identifying a category of television channels corresponding to the information identifying the one or more television channels.

14. The method of claim 11,
further comprising:
obtaining another image of a program provided on another television channel identified by the information identifying the one or more television channels included in the identified set of slideshow configuration parameters; and
providing the other image to the display,
the other image being provided before, simultaneously with, or after the image.

15. The method of claim 14, where the identified set of slideshow configuration parameters further includes information identifying an order in which images, of programs provided on television channels identified by the information identifying the one or more television channels included in the identified set of slideshow configuration parameters, are to be obtained, and
where obtaining the image and obtaining the other image occur in a sequence based on the order.

16. The method of claim 11, where the identified set of slideshow configuration parameters further includes information identifying a special effect with which the image is to be provided, and
where providing the image to the display includes:
providing the image to the display with the special effect.

17. The method of claim 11, where the identified set of slideshow configuration parameters further includes a value representing a quantity of images, of programs provided on television channels, to be simultaneously provided to the display, and
where providing the image to the display includes:
providing the quantity of images to the display,
the quantity of images including the image and at least one other image of a program provided on another television channel.

18. The method of claim 11, where the identified set of slideshow configuration parameters further includes a value representing an amount of time during which the image is to be provided to the display before another image, of a program provided on another television channel, is provided to the display,
where providing the image includes providing the image during the amount of time, and
where the method further comprises:
providing the other image to the display after the amount of time.

19. The method of claim 11, where the trigger includes a first trigger,
the method further comprising:
detecting a second trigger;
searching, using at least one of a date or a time associated with detecting the second trigger, the memory to identify another set of slideshow configuration parameters from the stored plurality of sets of slideshow configuration parameters,
the other set of slideshow configuration parameters including information identifying a category of television channels;

obtaining a plurality of images of television programs provided on one or more television channels identified by the information identifying the category of television channels;
providing the plurality of images to the display;
detecting selection of one image of the plurality of images; and
tuning to a television channel corresponding to the one image based on detecting the selection of the one image.

20. One or more non-transitory computer readable media storing instructions, the instructions comprising:
a plurality of instructions which, when executed by a device, cause the device to:
receive, from a user, a set of slideshow configuration parameters that includes:
first information identifying a first channel,
second information identifying a second channel different than the first channel,
third information identifying a number of images to be simultaneously provided, and
fourth information identifying a period of time during which the set of slideshow configuration parameters applies;
store the set of slideshow configuration parameters as part of a plurality of sets of slideshow configuration parameters,
each set of slideshow configuration parameters, of the plurality of sets of slideshow configuration parameters, including:
information identifying one or more television channels, and
information identifying a different period of time, and
each set of slideshow configuration parameters, of the plurality of sets of slideshow configuration parameters, being received from the user;
detect a trigger after receiving the set of slideshow configuration parameters;
search the plurality of sets of slideshow configuration parameters using at least one of a date or a time associated with detecting the trigger;
determine, based on searching the plurality of sets of slideshow configuration parameters, that the at least one of the date or the time corresponds to the period of time identified by the fourth information;
obtain a first image that includes an image of a program provided on the first channel, based on detecting the trigger and based on the first information;
obtain a second image that includes an image of a program provided on the second channel, based on detecting the trigger and based on the second information; and
simultaneously provide the first image and the second image to a display as a part of a slideshow,
the first image and the second image being simultaneously provided, to the user via the display, based on the third information.

21. The one or more non-transitory computer readable media of claim 20, where one or more instructions, of the plurality of instructions, to simultaneously provide the first image and the second image include one or more instructions to:
provide the first image and the second image in flying windows on the display,
provide the first image and the second image on faces of a rotating cube, provide the first image and the second image as stacked images, or provide the first image and the second image as tiled images.

22. The one or more non-transitory computer readable media of claim 20, the instructions further comprising:

one or more instructions to detect selection of the first image or the second image; and one or more instructions to tune the device to the first channel or the second channel based on detecting the selection of the first image or the second image.

23. The one or more non-transitory computer readable media of claim 20, where one or more instructions, of the plurality of instructions, to obtain the first image include one or more instructions to:

send a request for the first image to a server, and receive the first image from the server.

\* \* \* \* \*